ent Office 2,807,637
Patented Sept. 24, 1957

2,807,637

O-ARYL O,O-DIALKYL PHOSPHOROTHIOATES

Harold R. Slagh and Edgar C. Britton, Midland, Mich., assignors to The Dow Chemical Company, Midland, Mich., a corporation of Delaware No Drawing. Application March 5, 1956,
Serial No. 569,285

5 Claims. (Cl. 260—461)

This invention is concerned with the O-aryl O,O-dialkyl phosphorothioates having the formula

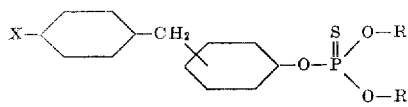

In this and succeeding formulae X represents hydrogen or chlorine and R represents a methyl or ethyl radical. These new compounds are viscous liquids, somewhat soluble in many organic solvents and of very low solubility in water. The compounds are useful as plant growth control agents and are adaptable to be employed for the control of the growth and killing of plants and for the sterilization of soil with regard to plant growth. The compounds are also effective as parasiticides and adapted to be employed for the control of mites and insect organisms such as aphids and flies.

The new compounds may be prepared by reacting an O-aryl phosphorodichloridothiate of the formula

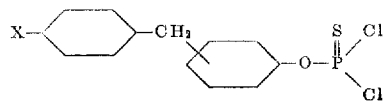

with an alkali metal methylate or an alkali metal ethylate. The reaction is carried out in an inert organic solvent and conveniently in an excess of the alcohol employed in the preparation of the alcoholate. Good results are obtained when employing two molecular proportions of the alcoholate with each molecular proportion of the O-aryl phosphorodichloridothioate. The alcoholate preferably is employed as a sodium salt and may be prepared by reacting methanol or ethanol with sodium in an inert organic solvent and conveniently in an excess of the alcohol employed in the preparation of the alcoholate. The reaction takes place smoothly at the temperature range of from 0 to 60° C., with the formation of the desired product and alkali metal chloride of reaction. The reaction is exothermic and the temperature may be controlled by regulating the rate of contacting the reactants and by external cooling.

In carrying out the reaction, the alkali metal alcoholate is added portionwise to the phosphorodichloridothioate with stirring and at the contacting temperature range. Upon completion of the reaction, the solvent is removed from the mixture by evaporation and the residue dispersed in a water immiscible solvent such as benzene, carbon tetrachloride or ethylene dichloride. The resultant mixture may be successively washed with water and dilute aqueous alkali metal hydroxide. The separation is then accomplished by evaporation of the solvent. If desired, the product may be further purified by fractional distillation under reduced pressure.

The following examples illustrate the invention but are not to be construed as limiting.

EXAMPLE 1

O-(4-benzylphenyl) O,O-dimethyl phosphorothioate

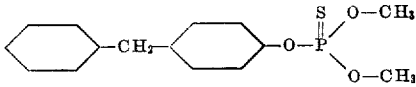

Sodium (6.9 grams, 0.3 mole) was dissolved in 150 milliliters of methanol to prepare an alcoholic solution of sodium methylate. This solution was added portionwise to 47.5 grams (0.15 mole) of O-(4-benzylphenyl) phosphorodichloridothioate over a period of 0.5 hour. The addition was carried out with stirring and cooling and at a temperature of from 10° to 20° C. Stirring was thereafter continued for one hour to complete the reaction. The methanol was then removed by evaporation and the residue dissolved in benzene. The resulting solution was washed with water and the benzene thereafter removed from the washed product by evaporation to obtain an O-(4-benzylphenyl) O,O-dimethyl phosphorothioate product as a liquid residue. This product had a density of 1.109 at 25° C., a refractive index $n/D$ of 1.5219 at 25° C. and a sulphur content of 10.32 percent as compared to a theoretical content of 10.4 percent.

EXAMPLE 2

O-(4-benzylphenyl) O,O-diethyl phosphorothioate

Sodium (5.52 grams, 0.24 mole) was dissolved in 130 milliliters of ethanol to prepare an ethanol solution of the corresponding alcoholate. This solution was added portionwise to 38.1 grams (0.12 mole) of O-(4-benzylphenyl) phosphorodichloridothioate over a period of 0.5 hour. This operation was carried out with stirring and at a temperature of from 10° to 20° C. Stirring was thereafter continued for one hour at room temperature to complete the reaction. The reaction mixture was then treated as described in Example 1 to separate an O-(4-benzylphenyl) O,O-diethyl phosphorothioate product as a liquid residue. This product had a density of 1.268 at 25° C. and a refractive index $n/D$ of 1.5758 at 25° C.

In a similar manner O-(2-benzylphenyl) phosphorodichloridothiate is reacted with sodium methylate to prepare an O-(2-benzylphenyl) O,O-dimethyl phosphorothioate product having a molecular weight of 308.

EXAMPLE 3

O-[4-(p-chlorobenzyl)-phenyl] O,O-dimethyl phosphorothioate

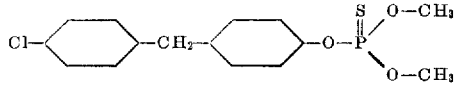

Sodium (4.15 grams, 0.18 mole) was dissolved in 80 millilters of methanol and the resulting solution added portionwise with stirring and cooling to 31.6 grams (0.18 mole) of O-[4(p-chlorobenzyl)-phenyl] phosphorodichloridothioate. The addition was carried out over a period of 0.5 hour and at a temperature of from 10° to 20° C. Stirring was thereafter continued for one hour to complete the reaction. The reaction mixture was then diluted with benzene and the resulting mixture washed with water. Upon evaporation of the benzene, an O-[4-(p-chlorobenzyl)-phenyl] O,O-dimethyl phosphorothioate product was obtained as a liquid residue. This product had a density of 1.268 at 25° C., a refractive index $n/D$ of 1.5758 at 25° C. and a phosphorus content of 8.97 percent.

EXAMPLE 4

O-[4-(p-chlorobenzyl)-phenyl] O,O-diethyl phosphorothioate

Sodium (4.15 grams, 0.18 mole) was dissolved in 150 milliliters of ethanol and the resulting mixture added portionwise with stirring to 31.6 grams (0.09 mole) of O-[4-(p-chlorobenzyl)-phenyl] phosphorodichloridothioate. The addition was carried out over a period of 0.5 hour and at a temperature of from 10° to 20° C. Following the addition, stirring was continued for 1.5 hours to complete the reaction. The ethanol was then removed by evaporation, the residue dissolved in benzene and the benzene solution washed with water. As a result of these operations, there was obtained an O-[4-(p-chlorobenzyl)-phenyl] O,O-diethyl phosphorothioate product as a liquid residue. This product had a density of 1.207 at 25° C. and a refractive index n/D of 1.5591 at 25° C.

In a similar manner other O-benzylphenyl O,O-dialkyl phosphorothioates may be prepared of which the following are representative.

O-(2-benzylphenyl) O,O-diethyl phosphorothioate by reacting together sodium ethylate and O-(2-benzylphenyl) phosphorodichloridothioate.

O-[2-(p-chlorobenzyl)-phenyl] O,O-dimethyl phosphorothioate by reacting together sodium methylate and O-[2-(p-chlorobenzyl)-phenyl] phosphorodichloridothioate.

The compounds of the present invention are valuable as parasiticides for the control of insect pests and for the treatment of soil for the control of the growth of seeds and emerging seedlings of many undesirable plant species. For such use, the compounds may be dispersed on a finely divided solid carrier and employed as dusts. Also, the compounds may be employed in organic solvent solutions and as constituents of aqueous dispersions and emulsions. In representative operations good controls of the growth of many varieties of seeds and emerging seedlings are obtained with the new phosphorothioate compounds at dosages of 50 pounds per acre.

The O-aryl phosphorodichloridothioates employed as starting materials as herein described may be prepared by reacting a molecular excess of phosphorus thiochloride ($PSCl_3$) with an alkali metal benzyl-phenolate. Good results are obtained when employing from two to four moles of phosphorus thiochloride per mole of benzylphenolate. The phenolate, preferable as sodium salt, is added portionwise with stirring to the phosphorus thiochloride and the mixture subsequently warmed for a period of time to complete the reaction. The reaction mixture is then filtered and the filtrate fractionally distilled under reduced pressure to separate the product.

We claim:

1. An O-aryl O,O-dialkyl phosphorothioate of the formula

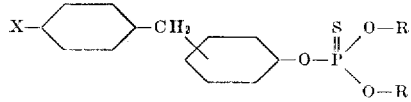

wherein X represents a member of the group consisting of hydrogen and chlorine and R represents a member of the group consisting of the methyl and ethyl radicals.

2. O-(4-benzylphenyl) O,O-dimethyl phosphorothioate.

3. O-(benzylphenyl) O,O-diethyl phosphorothioate.

4. O-[4-(p-chlorobenzyl)-phenyl] O,O-dimethyl phosphorothioate.

5. O-[4-(p-chlorobenzyl-phenyl] O,O-diethyl phosphorothioate.

No references cited.

U. S. DEPARTMENT OF COMMERCE
PATENT OFFICE
CERTIFICATE OF CORRECTION

Patent No. 2,807,637

September 24, 1957

Harold R. Slagh et al.

It is hereby certified that error appears in the printed specification of the above numbered patent requiring correction and that the said Letters Patent should read as corrected below.

Column 1, line 35, for "phosphorodichloridothiate" read -- phosphorodichloridothioate --; column 2, line 42, for "dichloridothiate" read -- dichloridothioate --; column 4, line 27, for "O-(benzylphenyl)" read -- O-(4-benzylphenyl) --; line 30, for "O-[4-(p-chlorobenzyl-phenyl]" read O-[4-(p-chlorobenzyl)-phenyl] --.

Signed and sealed this 18th day of March 1958.

(SEAL)
Attest:
KARL H. AXLINE

Attesting Officer

ROBERT C. WATSON
Commissioner of Patents